Patented Sept. 2, 1952

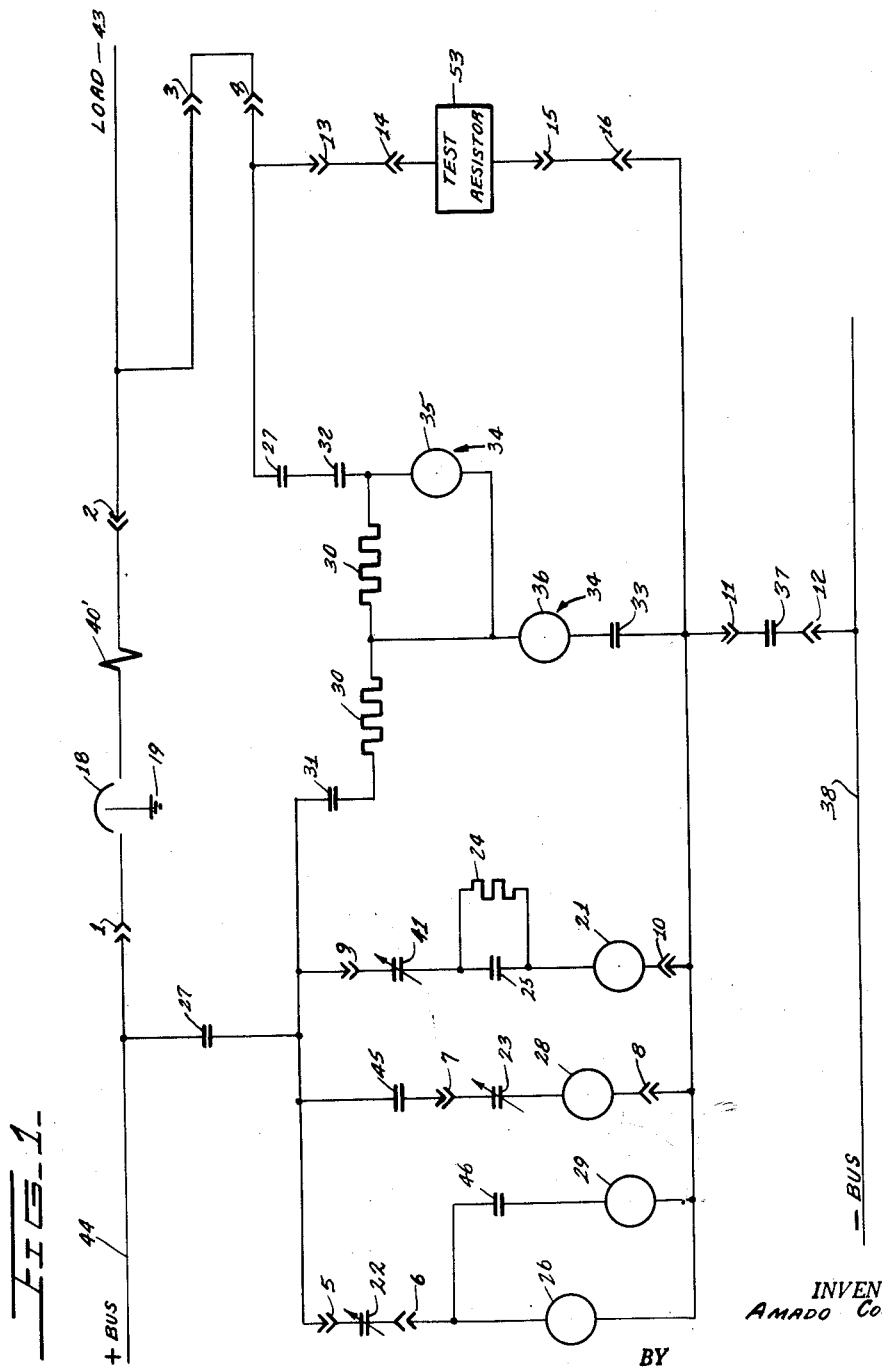

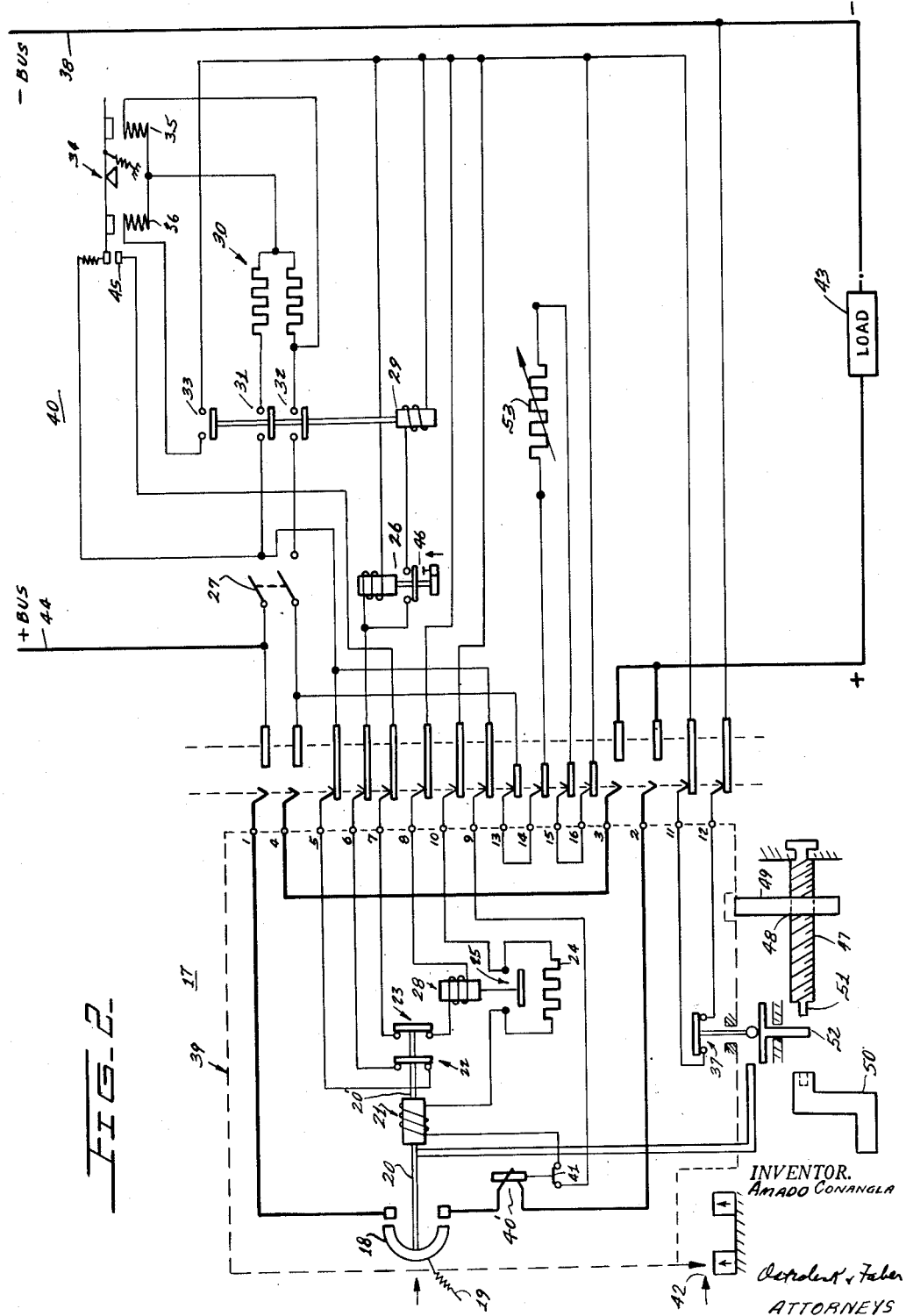

2,609,421

UNITED STATES PATENT OFFICE 2,609,421

RECLOSING CIRCUIT BREAKER

Amado Conangla, Sharon Hill, Pa., assignor to I-T-E Circuit Breaker Company, Philadelphia, Pa., a corporation of Pennsylvania Application April 11, 1951, Serial No. 220,503

5 Claims. (Cl. 175—183)

My invention relates to novel testing circuits for testing circuit breaker operations, and more particularly relates to a novel testing circuit in which the line voltage and currents, and the same electrical elements which test the load circuit conditions, are employed with the circuit breaker in its test position for testing the circuit.

In the operation of direct current circuit breakers including recloser circuit breakers, it is desirable to test the load on which the circuit breaker may reclose before reclosing is attempted.

To this end it has long been the common practice to connect a load measuring resistor across the terminals of the open circuit breaker. This resistor is then in series with the load and thus a "feeler" current is then sent out through the load measuring resistor.

A connection is then made from the said point of this load measuring resistor to one winding on a balanced relay and to a second winding on the relay to the opposite bus terminal.

The "feeler" current establishes a series of voltage drops through the load measuring resistors and the load or electrical equipment of the system.

The voltage drop across the load during this measuring operation is used to act as a voltage differential between the voltages applied to the coils of the balanced relay.

With little or no voltage drop on the load indicating a prospective high load current, i. e., a possible short circuit, the current flowing as a result of the voltage applied to the winding across a part of the measuring load resistor is insufficient to overcome the current in the second winding and the relay does not operate to initiate closing operations.

If on the other hand the load resistance is high, then the differential voltage applied to the operating or closing winding of the relay is sufficient to overcome the effect of the voltage across the holding coil and operations to close the circuit breaker are initiated.

Circuit breakers of the above described type are usually of the drawout type, i. e., they are mounted in cubicles into and out of which they may be racked. They are provided with back connection studs connected to contacts which, when the circuit breaker is racked into its cell, connect the circuit breaker contacts to the power source and load that the circuit breaker is to protect.

Such a circuit breaker is often racked out to a test position in which the circuit breaker is to be tested for its operating characteristics, i. e., the current values up to which it recloses, the current values in response to which it will trip open, its proper load carrying current characteristics, etc.

The above operations are old and well known and described here as the necessary setting for the present invention.

In accordance with my invention, the overall performance of an automatic reclosing circuit breaker of the type mentioned above and its associated control circuits and devices can be checked by replacing the actual load connected to the load side of the circuit breaker with a simulated load consisting in an adjustable calibrated resistor. This test procedure requires disconnecting the outgoing line from the load terminal of the circuit breaker and connecting in its place the test resistor. Since the circuit breaker may reclose automatically during the test, thereby applying full source potential across the test resistor, this test resistor should have sufficient thermal capacity to withstand the current due to full voltage.

A resistor with smaller thermal capacity can be used if a piece of insulating material is placed across the circuit breaker bridge to prevent its closing a circuit. A resistor having sufficient thermal capacity is usually a heavy and cumbersome piece of equipment. The expedient of placing insulating material across the circuit breaker bridge prevents the breaker from effecting a complete closing operation and thereby hampers the test.

The present invention accordingly simplifies the testing of the circuit breaker by making it unnecessary to disturb the outgoing line connection and it avoids the difficulties mentioned above.

The invention is shown by way of illustration as applied to a single-pole automatic reclosing circuit breaker. The circuit breaker and some of its associated control devices are mounted on a movable panel or structure. The connections to the external circuits are made by means of sliding separable contacts consisting of moving elements fastened to the circuit breaker, and stationary elements fastened to a supporting structure or housing. The separable contacts are arranged to make or break their respective circuits depending on the position of the circuit breaker relative to its housing or supporting structure. A withdrawal mechanism is provided to change the position of the breaker relative to its housing.

When the breaker is moved to one extreme position, main separable or disconnect contacts make contact and insert the single-pole circuit breaker between the positive bus and the outgoing positive line connected to the load. This extreme position will be referred to as the "connected position." Control separable contacts are provided which are connected when the breaker is in the connected position. Other control separable contacts are open when the breaker is in the connected position.

When the breaker is moved to the "test position," the main separable contacts open and the control separable contacts remain closed, and the further control separable contacts close.

Essentially then, the invention consists in arranging the breaker for drawout mounting and providing a test position in which all the necessary connections and disconnections are automatically made for testing with a test resistor and with power derived from the normal source.

Accordingly an object of my invention is to provide a novel test circuit for drawout circuit breakers.

A further object of my invention is to provide a novel circuit arrangement for utilizing the power supply for testing the circuit breaker operating characteristics in its test position.

Still another object of my invention is to provide a novel testing circuit for a circuit breaker in test position in which load conditions are simulated for testing the circuit breaker.

These and other objects will become clear from the detailed description to follow in which Figure 1 is a single line diagram of a preferred form of my invention.

Figure 2 is a standard simplified circuit diagram of my invention.

Referring to the drawings, the automatic reclosing circuit breaker 17 has a circuit breaker contact 18 which is biased into the open position by a spring 19. Attached to the circuit breaker 18 by means of rod 20 is plunger 20' operable inside solenoid closing coil 21. This extension of the rod 20 carries suitable means for opening and closing two auxiliary switches 22 and 23.

The relation between the two auxiliary switches 22 and 23 and the circuit breaker 18 is such that when the circuit breaker 18 is open, the two auxiliary switches 22 and 23 are closed; and when the circuit breaker 18 is closed, the two auxiliary switches 22 and 23 are open. The purpose of the two auxiliary switches 22 and 23 will be explained below.

In series with the solenoid closing coil 21 is a protective resistor 24 which is by-passed by a pair of relay contacts 25 when these contacts are closed by movement of the armature in response to the energization of closing relay 28. The function of the closing relay 28 and the aforementioned contacts 25 will be explained below.

A time delay relay 26 is provided to institute the automatic reclosing sequence after the master control switch 27 is closed.

A resistor control relay 29 is provided to connect and disconnect the load measuring resistor 30, as explained below.

Three pairs of contacts 31, 32, 33 are opened and closed by the operation of the resistor control relay 29.

The load measuring relay 34 is composed of two coils 35 and 36. One of these coils 35 is permanently connected across one half of the load measuring resistor 30. The other coil 36 of the load measuring relay 34 is connected between the midpoint of the load measuring resistor and one contact of a pair of contacts 33 which are controlled by the resistor control relay 29. The purpose and function of the load measuring resistor 30 and the load measuring relay 34 will be explained below.

Compartment interlocking switch contact 37 is provided to connect the control circuit of automatic reclosing circuit breaker 17 to the negative bus 38. The action and purpose of the compartment interlocking switch contact 37 will be explained below.

A movable frame 39 is provided upon which is mounted the circuit breaker 17, the plunger rod 20, the biasing spring 19, the solenoid closing coil 21, the two auxiliary switches 22 and 23, the closing relay 28, the closing relay contacts 25, the protective resistor 24, the interlock switch 37, and sixteen separable contacts 1–6 which electrically connect the control circuits of the movable frame 39 to the control circuits of the stationary frame 40. In addition, an overcurrent relay 40' and its associated contacts 41 is mounted on the movable frame 39.

To place the automatic reclosing circuit breaker 17 into operating position, the movable frame 39 is "racked" into the "connected" position by a racking mechanism such as shown in Patent 2,554,510.

A position indicator 42 attached to the movable frame 39 is provided with an arrow which is opposite the indicator "connected" when the movable frame 39 has been placed to the corresponding position. In the "connected" position, movable separable contacts 1–4 and 5–12 will be in segment connected position, while movable separable contacts 13 to 16 will be disconnected from their segments.

Separable contacts 1 and 2 connect the primary load current circuit inclusive of the series combination of the circuit breaker contacts 18 and the overcurrent relay 40' between the load 43 and the positive bus 44 when the removable element 17 is in the "connected" position.

Separable contacts 3 and 4 connect the load 43 to one side of the master control switch 27.

Two separable contacts 5 and 6 connect one of the auxiliary switches 22 of the circuit breaker between the time delay relay 26 and one side of the master control switch 27. Two separable contacts 7 and 8 connect the series combination of the closing relay 28 and one of the auxiliary switches 23 between the load measuring relay contacts 45 and separable contact 11.

Two separable contacts 9 and 10 connect the series combination of the closing coil 21, the protective resistor 24 which under certain conditions is by-passed by contacts 25 of the closing relay 28, and the contacts 41 of the overcurrent relay 40' between separable contact 11 and the master control switch 27.

Two separable contacts 11 and 12 connect the compartment interlocking switch between the negative bus 38 and the thermal delay relay 26.

To start the automatic reclosing sequence, master control switch 27 is closed. This will complete a circuit from the positive bus 44, through the master control switch 27, separable contact 5, auxiliary switch 22, separable contact 6, the time delay relay coil 26, separable contact 11, the interlock switch 37, and separable contact 12, to the negative bus 38. The above circuit being completed, time delay relay coil 26 will be energized. After a predetermined length of time, time delay relay coil 26 will close its contacts 46.

This will complete a circuit from the positive bus 44, through master control switch 27, separable contact 5, auxiliary switch 22, separable contact 6, the contacts 46, resistor control relay 29, separable contact 11, the interlock switch 37, separable contact 12 to the negative bus 38.

Energization of the resistor control relay 29 will close its three pairs of contacts 31, 32, 33. One of these pairs of contacts 31 connects one end of the load measuring resistor 30 to one side of the master control switch 27. Another of these pairs of contacts 32 connects the opposite end of the load measuring resistor 30 to the master control switch 27. The third of these pairs of contacts 33 connects the coil 36 of the load control relay 34 which is attached to the midpoint of the control resistor 30 to one of the separable contacts 11.

Thus two circuits are established. One of those is established by a connection of the load measuring resistor across the terminals of the circuit breaker 18 in series with the load 43 from the positive bus 44, through the master control switch 27, one pair of contacts 31 of the resistor control relay 29, the entire control resistor 30, a second pair of contacts 32 of the resistor control relay 29, the master control switch 27, one of the separable contacts 4, another of the separable contacts 3, and the load 43, back to the negative bus 38.

The other circuit connects the winding 36 across the bus lines to measure line voltage over a connection from the positive bus 44, through master control switch 27, one pair of contacts 31 of the resistor control relay 29, one half of the load control resistor 30, one of the coils 36 of the load measuring relay 34, a third pair of contacts 33 of the resistor control relay 29, one of the separable contacts 11, the interlock switch 37, and another separable contact 12, back through the negative bus 38.

Thus, essentially, the load 43 has been placed in series with the load control resistor 30, and the series combination of the two has been connected between the positive bus 44 and the negative bus 38.

In addition, the mid-point of the load control resistor 30 has been connected through one of the coils 36 of the load measuring relay 34 to the negative bus 38.

A feeler circuit has now been established which is passing through the load measuring resistor 30 and the resistance of the load 43.

Since the electrical potential existing between positive bus 44 and negative bus 38 is a constant, this current is directly dependent upon the resistance of the load. The feeler current causes voltage drops in the load measuring resistor 30. These voltage drops are substantially measured by the two coils 35, 36 of the load measuring relay 34 in the manner well known in the art. These coils are adjusted so that the load measuring relay 34 will close its contacts 45 only when the load resistance 43 is above a predetermined minimum. If the load resistance 43 is below the minimum value at which it is desired to limit the load current, the load measuring relay 34 will not close its contacts and will therefore not complete the energizing circuit for the closing relay 28 over contacts 45 and separable contacts 7 and 8. Under this latter condition, the circuit breaker 18 will not close and the load resistance 43 will not be connected directly to the positive bus 44 over the contacts of the circuit breaker 18.

Assuming that the load resistance 43 is greater than the aforementioned minimum value, load measuring relay 34 will close its contacts 45.

This will complete a circuit from the positive bus 44 through the master control switch 27, the contacts 45 of the load measuring relay 34, one of the separable contacts 7, one of the auxiliary switches 23, the closing relay 28, another separable contact 8, one of the separable contacts 11, the interlock switch 37, and another separable contact 12 to the negative bus 38.

The above circuit being completed, closing relay 28 will be energized, and its contacts 25 will close, by-passing the current limiting resistor 24.

A circuit is now established from the positive bus 44, through the master control switch 27, one of the separable contacts 9, the overcurrent relay contacts 42, the contacts 25 of the closing relay 28, the closing magnet 21, another separable contact 10, one of the separable contacts 11, the interlock switch 37, and another separable contact 12 to the negative bus 38.

Thus the closing coil 21 is energized with full line voltage, which gives its sufficient power to draw the magnetic plunger 20' against the pull of the biasing opening spring 19. Since the circuit breaker 18 is attached to this rod 20', its contacts will be drawn into the closed position.

The load has now been connected through one of the separable contacts 2, the overcurrent relay 41, the closed circuit breaker 18, and another separable contact 1, to the positive bus 44.

The movement of the magnetic plunger 20' carrying the circuit breaker 18 to the closed position of the circuit breaker 18 will open the two auxiliary switches 22 and 23.

The opening of one of the auxiliary switches 22 will break the circuit which has previously been established through the time delay relay 26. The time delay relay 26 will open its contacts 46, thus de-energizing resistor control relay 29, whose three sets of contacts 31, 32, 33 will drop out, isolating the load measuring resistor 30 and the load measuring relay 34 from its previous position of shunting the series combination of the circuit breaker 18 and the overcurrent relay 41.

In addition, the other auxiliary switch 23 will open, opening the circuit previously established for supplying a current through the closing relay 28. The closing relay contacts 25 will open, thus replacing the current limiting resistor 24 in series with the closing coil 21, allowing a decreased value of current to flow through the closing coil 41 to keep the circuit breaker 18 closed. This value of holding current will be such that the coil of closing relay 28 will not exceed its continuously rated wattage.

The automatic reclosing circuit breaker 17 is now in normal operation and is permitting load current to flow to the external load 43.

A novel testing circuit has been incorporated into the circuits of the automatic reclosing circuit breaker 17 described above. It requires the placing of a test resistor 53 between two separable contacts 14 and 15. One of these separable contacts 14 is connected to another separable contact 13. This second separable contact serves to connect the first separable contact 14 to one side of the master control switch 27. The other separable contact 15 which is connected to the test resistor 53 is also connected to a second separable contact 16. This second separable contact 16 connects the separable contact 15 to a third separable contact 11.

The test resistor 53 is mounted on the stationary frame 40. The four separable contacts 13, 14, 15 and 16 associated with it are for purposes of connecting it to the circuit connections mounted on the movable frame 39.

When the movable frame 39 is in the connected position, separable contacts 1–12 are closed and separable contacts 13–16 are open, as mentioned before.

In order to test the automatic reclosing circuit breaker 17 in operation, the circuit breaker 18 must be returned to its open position by means to be described below. The movable frame 39 is then racked out to the "test" position by means to be described below.

In the test position, the separable contacts 1, 2, 3 and 4 will open, separable contacts 13—14 and 15—16 will close, while separable contacts 5 to 12 remain closed.

The test resistor 53 may be set to an equivalent value of load resistance 43 under which the operation of the automatic reclosing circuit breaker 17 is desired to be tested. As can be noted in Figures 1 and 2, separable contacts 13–16 will connect the test resistor 53 between the master control switch 27 and separable contact 11. Since separable contacts 3 and 4 are opened in the test position, the load is disconnected from the master control switch 27. Also, since separable contacts 1 and 2 are open, closing of the circuit breaker 18 during test procedures will not connect the load 43 to the positive bus 44.

Thus, owing to the above connections, the test resistor 53 has been connected in such position as to simulate the load resistance 43. However, due to the unique manner of connecting the test resistor 53, closing of the circuit breaker 18 will not place the test resistor directly across the power busses 38 and 44. Hence the test resistor 46 need not have the large thermal capacity which the load resistance 43 has. It need only be capable of withstanding the relatively small feeler current.

To institute the testing procedure after the movable frame 39 has been placed in the "test" position, master control switch 27 is closed. An automatic closing sequence as outlined above takes place.

Thus the previously described circuit for time delay relay 26 will first be closed. This will in turn complete an energizing circuit for resistor control relay 29. Energization of relay 29 will place the load measuring resistor 30 in series with the calibrated test resistor 53 across the busses 38 and 44 to measure the current flow. Winding 29 will also connect winding 36 across the line to measure the voltage. If the current through winding 36 is sufficiently greater than that flowing through winding 35, contacts 45 will be closed.

An energizing circuit will therefore be completed for closing relay 28 which will in turn complete an energizing circuit for closing magnet 21 to in turn close the circuit breaker 18.

The operator testing the automatic reclosing circuit breaker 17 will note whether or not the circuit breaker contacts 18 close. If it closes, the circuit breaker contacts 18 will close for a value of load resistance 43 identical with the value of test resistance 53. If the circuit breaker 18 does not close, the circuit breaker 18 will not close for the corresponding value of load resistance 43.

Thus the operation of the automatic reclosing circuit breaker 17 may be fully tested under various simulated load resistance values by means of corresponding settings of the test resistor 53.

Before moving the movable frame 39 from the "test" position to the "connected" position or reverse, the master control switch 27 should be opened. Opening the master control switch 27 will break the circuit supplying current to the closing soil, releasing the circuit breaker 18 from the closed position. Thus, if the movable frame 39 is in the "test" position, the load resistance 43 will not be connected to the positive bus 44 when the movable frame 39 is moved to the "connected" position, without going through the proper closing sequence.

Similarly, the circuit breaker contacts 18 must be opened when the movable frame 39 is moved from the "connected" position to the "test" position to prevent arcing at and subsequent burning of the separable contacts 1—2.

For the above reasons, a safety device 37 has been incorporated in the moving mechanism used in conjunction with the movable frame 39.

This device has previously been referred to as the interlock switch 37.

As may be seen in Figure 2, the movable frame 39 is moved between the "test" and "connected" positions by means of a withdrawal screw 47 which is fastened to the fixed frame 40 in such a manner that it may only rotate about its axis. The withdrawal screw 47 is threaded through a tapped hole 48, which has been placed through a member 49 securely fastened to the movable frame 39. A crank 50 is provided which fits on the square head 51 of the withdrawal screw 47. However, in order to place the crank 50 upon the square head 51 of the withdrawal screw 47, a plate 52 which has been placed directly in front of the square head 51 must be depressed. Depressing this plate will move the armature of the interlock switch 37 in such a manner that it will separate its contacts. Thus the current flowing through the closing coil 21 will be interrupted during the process of placing the crank 50 upon the withdrawal screw 47 due to the opening of the interlock switch 37.

When the closing coil 21 is de-energized, it will release the circuit breaker 18, allowing the biasing spring 19 to draw it away from its contacts, breaking the circuit it may have been maintaining between the separable contacts 1 and 2. Once the above action has been completed, there is no danger of harming the equipment, even though the master control switch has not been opened.

After the crank 50 has been placed on the square head 51 of the withdrawal screw 47, the screw 47 may be rotated in the proper direction to move the movable frame 39 to the required position. When the movable frame has been placed in the required position, the crank 50 is removed allowing the protective plate 52 to fall into its original position, closing the interlock switch 37, and thus preparing the automatic reclosing circuit breaker 17 to be connected.

The overcurrent relay 41 mentioned before is connected between the circuit breaker 18 and the separable contact 2. Thus the load current flows through this overcurrent relay. If an overload current is present, the overcurrent relay 41 will open its contacts 42, breaking the circuit supply current to the closing coil 21. The circuit breaker 18 will then open. The current limiting resistor 24 is of such a value that it will permit a current sufficient to hold closing magnet in closed position but not sufficient current to pull the magnet closed from open position. The overcurrent relay 41 is a standard protective device.

The procedure to be followed for testing the automatic reclosing circuit breaker 17 is here outlined.

Place the master control switch 27 into the off position. Depress the protective plate 52 and place the end of crank 50 upon the square head 51. Rotate the withdrawal screw 47 in the proper direction until the position indicator 42 shows the movable frame to be in the "test" position. Remove the crank 50. Set the test resistor 53 to a value corresponding to the load resistance 43 value under which the operation of the automatic reclosing circuit breaker 17 is desired. Close the master control switch 27. Note whether or not the circuit breaker 18 closes. If it does, the circuit breaker 18 will close for a corresponding load. If it does not close, the circuit breaker 18 will not close for a corresponding load. The load measuring relay 34 may be adjusted so as to permit the circuit breaker 18 to close at the desired value of equivalent load circuit. This may be evaluated by calculations based upon Ohm's law.

To return the movable frame 39 to the "connector" position, open the master control switch 27. Depress the protective plate 52, place the crank upon the withdrawal screw 47 and rotate the withdrawal screw 47 in the proper direction to place the movable frame 39 into the "connected" position. The relation between movable element 39 and fixed cubicle is shown by position indicator 42. Remove the crank 50 and then close the master control switch 27. The automatic reclosing circuit breaker 17 will be in normal operation.

The circuit breaker contacts 18 will then function either to close the contacts 18 if the load resistance 43 is of sufficient magnitude to limit the load current to a permissible value, or to prevent the reclosing of the circuit breaker contacts 18 if the load measuring relay 34 anticipates a load current in excess of a predetermined permissible value.

While I have illustrated my invention in connection with a single pole circuit breaker, it will be understood that it may be used with multi-pole circuit breakers and I do not wish to be limited by the example herein provided except as set forth in the appended claims.

I claim:

1. In a draw-out circuit breaker for an electrical system having a connected position, a test position, and having a main contact engaged and a main contact disengaged position, moving separable contacts movable with said circuit breaker and comprising main separable contacts for connecting said circuit breaker to the load and to the source of power when said circuit breaker is in its connected position and for disconnecting said circuit breaker from the load and source of power when said circuit breaker is in its test position, auxiliary separable contacts, a load measuring resistor, a variable calibrated resistor, first circuit connections for connecting said load measuring resistor and calibrated resistor in series to said source of power through said auxiliary separable contacts when said circuit breaker is in the test position, second circuit connections for connecting said load measuring resistor in series with the load of the system to said source of power through said main contacts when said circuit breaker is in connected position, a load measuring relay, circuit connections controlled by said load measuring resistor for operating said load measuring relay when predetermined current flows in said load measuring resistor, a circuit breaker closing magnet, circuit connections controlled by said operated load measuring relay for operating said circuit breaker closing magnet to close said circuit breaker, a racking mechanism for racking said circuit breaker between said connected and test positions and means operative just before said racking mechanism is operated for rendering said circuit connection control of said load measuring resistor ineffective during the racking of said circuit between its test and connected positions.

2. In a draw-out circuit breaker for an electrical system having a connected position and a test position, and having a main contact engaged and a main contact disengaged position, moving separable contacts movable with said circuit breaker and comprising main separable contacts for connecting said circuit breaker to the load and to the source of power when said circuit breaker is in its connected position and for disconnecting said circuit breaker from the load and source of power when said circuit breaker is in its test position, auxiliary separable contacts, a load measuring resistor, an adjustable calibrated resistor, first circuit connections for connecting said load measuring resistor and calibrated resistor in series to said source of power through said auxiliary separable contacts when said circuit breaker is in the test position, second circuit connections for connecting said load measuring resistor in series with the load of the system to said source of power through said main contacts when said circuit breaker is in connected position, a load measuring relay, circuit connections controlled by said load measuring resistor for operating said load measuring relay when predetermined current flows in said load measuring resistor, a circuit breaker closing magnet, circuit connections controlled by said operated load measuring relay for operating said circuit breaker closing magnet to close said circuit breaker, and a racking mechanism for racking said circuit breaker between said connected and test positions.

3. In a draw-out circuit breaker for an electrical system having a connected position and a test position, and having a contact engaged and a contact disengaged position, moving separable contacts movable with said circuit breaker and comprising main separable contacts for connecting said circuit breaker to the load and to the source of power when said circuit breaker is in its connected position and for disconnecting said circuit breaker from the load and source of power when said circuit breaker is in its test position, auxiliary separable contacts, a calibrated resistor for simulating said load, first circuit connections for connecting said calibrated resistor to said source of power through said auxiliary separable contacts when said circuit breaker is in the test position, second circuit connections including said load of the system and said source of power through said main contacts when said circuit breaker is in connected position, a load measuring relay, circuit connections controlled by said first circuit connections for operating said load measuring relay, a circuit breaker closing magnet, circuit connections controlled by said operated load measuring relay for operating said circuit breaker closing magnet to close said circuit breaker, a racking mechanism for racking said circuit breaker between said connected and test positions and means operative just before said racking mechanism is operated for rendering said circuit connection control of said load measuring resistor ineffective.

4. In a draw-out circuit breaker for an electrical system having a connected position and a test position, and having a contact engaged and a contact disengaged position, moving separable contacts movable with said circuit breaker and comprising main separable contacts for connecting said circuit breaker to the load and to the source of power when said circuit breaker is in its connected position and for disconnecting said circuit breaker from the load and source of power when said circuit breaker is in its test position, auxiliary separable contacts, a calibrated resistor for simulating said load, first circuit connections including said calibrated resistor in series with said source of power through said auxiliary separable contacts when said circuit breaker is in the test position, second circuit connections including said load of the system and said source of power through said main contacts when said circuit breaker is in connected position, a load measuring relay, circuit connections controlled by said first and second circuit connections for operating said load measuring relay when predetermined current flows therein, a circuit breaker closing magnet, circuit connections controlled by said operated load measuring relay for operating said circuit breaker closing magnet to close said circuit breaker, a racking mechanism for racking said circuit breaker between said connected and test positions and means operative just before said racking mechanism is operated for rendering said circuit connection control of said load measuring resistor ineffective.

5. In a draw-out circuit breaker for an electrical system having a connected position and a test position, and having a contact engaged and a contact disengaged position, moving separable contacts movable with said circuit breaker and comprising main separable contacts for connecting said circuit breaker to the load and to the source of power when said circuit breaker is in its connected position and for disconnecting said circuit breaker from the load and source of power when said circuit breaker is in its test position, auxiliary separable contacts, a load measuring resistor, a calibrated resistor for simulating said load, first circuit connections including said calibrated resistor in series with said source of power through said auxiliary separable contacts when said circuit breaker is in the test position, second circuit connections including said load in series with said source of power through said main contacts when said circuit breaker is in connected position, a relay, circuit connections for operating said relay by said first circuit when said circuit breaker is in test position and by said second circuit when said circuit breaker is in operated position, a circuit breaker closing magnet, circuit connections controlled by said relay for operating said circuit breaker closing magnet to close said circuit breaker, a racking mechanism for racking said circuit breaker between said connected and test positions and means operative just before said racking mechanism is operated for rendering said circuit connection control of said load measuring resistor ineffective.

AMADO CONANGLA.

No references cited.